United States Patent
Song et al.

(10) Patent No.: US 11,144,199 B2
(45) Date of Patent: Oct. 12, 2021

(54) ELECTRONIC DEVICE AND CONTROL METHOD THEREFOR

(71) Applicant: SAMSUNG ELECTRONICS CO., LTD., Suwon-si (KR)

(72) Inventors: Jonghyuk Song, Suwon-si (KR); Woochul Shim, Suwon-si (KR); Joonun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/766,512

(22) PCT Filed: Dec. 4, 2018

(86) PCT No.: PCT/KR2018/015277
§ 371 (c)(1),
(2) Date: May 22, 2020

(87) PCT Pub. No.: WO2019/112310
PCT Pub. Date: Jun. 13, 2019

(65) Prior Publication Data
US 2020/0363948 A1    Nov. 19, 2020

(30) Foreign Application Priority Data

Dec. 8, 2017   (KR) .................. 10-2017-0168322

(51) Int. Cl.
*G06F 3/0488*   (2013.01)
*G06K 9/00*   (2006.01)

(52) U.S. Cl.
CPC ....... *G06F 3/04886* (2013.01); *G06K 9/0004* (2013.01); *G06K 9/00288* (2013.01); *G06K 9/00604* (2013.01)

(58) Field of Classification Search
CPC ........ G06F 3/04886; G06F 3/01; G06F 3/041; G06F 21/32; G06F 21/62; G06K 9/0004;
(Continued)

(56) References Cited

U.S. PATENT DOCUMENTS 9,760,888 B2    9/2017 Landrock et al.
10,248,779 B2   4/2019 Song et al.
(Continued)

FOREIGN PATENT DOCUMENTS

KR    10-2011-0085305 A    7/2011
KR    10-2015-0014788 A    2/2015
(Continued)

OTHER PUBLICATIONS

International Search Report (PCT/ISA/210) dated Mar. 15, 2019 issued by the International Searching Authority in International Application No. PCT/KR2018/015277.
(Continued)

*Primary Examiner* — Abhishek Sarma
(74) *Attorney, Agent, or Firm* — Sughrue Mion, PLLC

(57) ABSTRACT

An electronic device is disclosed. An electronic device comprises: a display; a storage for storing a user's personal information and biometric information; a biometric unit; and a processor for, when a screen provided on the display includes a virtual keyboard, identifying a user corresponding to biometric information acquired through the biometric unit on the basis of the stored biometric information, performing screen analysis so as to identify an information type required by a result of the screen analysis, acquiring information corresponding to the information type from the user's personal information, and inputting the acquired information onto the screen.

14 Claims, 8 Drawing Sheets

(58) Field of Classification Search
CPC .......... G06K 9/00288; G06K 9/00604; G06K 9/00597; G06K 9/00221
See application file for complete search history.

(56) References Cited

U.S. PATENT DOCUMENTS

| | | |
|---|---|---|
| 10,331,868 B2 | 6/2019 | Park |
| 2010/0215270 A1 | 8/2010 | Manohar et al. |
| 2013/0263039 A1 | 10/2013 | Fahlgren et al. |
| 2015/0095754 A1* | 4/2015 | Zhang .................. G06F 40/174 715/226 |
| 2015/0213245 A1 | 7/2015 | Tartz et al. |

FOREIGN PATENT DOCUMENTS

| | | |
|---|---|---|
| KR | 10-1514706 B1 | 4/2015 |
| KR | 10-2015-0082720 A | 7/2015 |
| KR | 10-2016-0114108 A | 10/2016 |
| KR | 10-1669252 B1 | 10/2016 |
| KR | 10-1722028 B1 | 3/2017 |
| WO | 2015/043163 A1 | 4/2015 |

OTHER PUBLICATIONS

Written Opinion (PCT/ISA/237) dated Mar. 15, 2019 issued by the International Searching Authority in International Application No. PCT/KR2018/015277.

* cited by examiner

| APPLICATION | ID | PASSWORD | CARD NUMBER | TELEPHONE NUMBER |
|---|---|---|---|---|
| A bank | abc | 1234abc | - | - |
| C bank | abc | abc1234 | 1234-xxxx-xxxx-4321 | - |
| E Shopping | xyz | 1234abc | 1234-xxxx-xxxx-4321 | 1-607-111-2222 |
| Mail application | xyz | abc1234 | - | - |

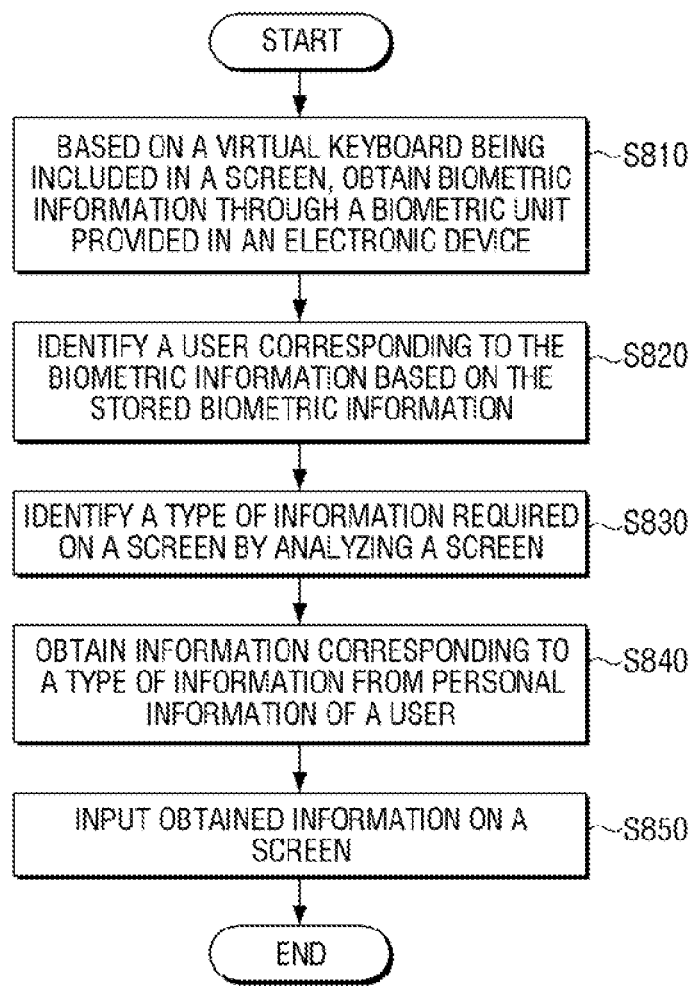

ELECTRONIC DEVICE AND CONTROL METHOD THEREFOR

TECHNICAL FIELD

The disclosure relates to an electronic device and a control method therefor. More particularly, the disclosure relates to an electronic device using user's biometric information and a control method therefor.

BACKGROUND ART

Due to the development of electronic technology, various types of electronic products have been developed and distributed, and functions performed using electronic devices also vary.

More users tend to process shopping payment, bank business, or the like, by using an electronic device.

When using an electronic device for shopping payment or a bank business, the input of user's personal information that requires security is necessary and thus, there is a danger of exposing personal information to a snooper, or the like, peeping at an electronic device, and there is an inconvenience that a user needs to directly input long and complex personal information.

Accordingly, there is a need to develop a method for inputting personal information required for doing a payment or a bank business by an electronic device instead of a user.

DISCLOSURE

Technical Problem

The disclosure is to address the above-described problems, and an object of the disclosure is to provide an electronic device for inputting personal information by identifying a user and a control method therefor.

Technical Solution

An electronic device according to an embodiment, an electronic device a display, a storage for storing a user's personal information and biometric information, a biometric unit, and a processor configured to, based on a screen provided on the display including a virtual keyboard, identify a user corresponding to biometric information acquired through the biometric unit on the basis of the stored biometric information, perform screen analysis so as to identify an information type required on the screen, acquire information corresponding to the information type from the user's personal information, and input the acquired information onto the screen.

The user's personal information may include a type of information required by each application and information corresponding to the type of the information, the type of the information comprises at least one of an identification), an e-mail, a password, a card number, a telephone number or a resident number.

The processor is configured to, based on a virtual keyboard being included in the screen, identify an application for providing the screen, identify a type of information required on the screen by analyzing the screen, and obtain information corresponding to the information from the storage based on the identified application.

The user's personal information may include a type of information required by each web site and information corresponding to the type of the information, and the type of the information comprises at least one of an identification), an e-mail, a password, a card number, a telephone number, or a resident number.

The processor is configured to, based on the screen being a screen provided through a web browser and the screen including a virtual keyboard, identity a web site accessed through the web browser, identify a type of information required on the screen by analyzing the screen, and obtain information corresponding to the information from the storage based on the identified web site.

The biometric unit may include a camera, and the biometric information obtained through the camera may be at least one of facial information and iris information.

The biometric unit may include a fingerprint recognition sensor, and the biometric information obtained through the fingerprint recognition sensor may be fingerprint information.

The processor may, based on obtaining information corresponding to the type of the information, sequentially generate a touch signal on a position of a key item corresponding to the obtained information based on the position information of the key item included in the virtual keyboard and input the obtained information on the screen.

The virtual keyboard is a keyboard to which an anti-keylogger is applied, and the processor is configured to, based on obtaining information corresponding to the type of the information, obtain position information of a key item included in the keyboard by analyzing the virtual keyboard, and sequentially generate a touch signal on a position of a key item corresponding to the obtained information and input the obtained information on the screen.

The biometric unit may include at least one of a camera and a fingerprint recognition sensor, and the processor is configured to, based on a virtual keyboard being included in a screen provided on the display, activate at least one of the camera and the fingerprint recognition sensor.

According to an embodiment, a control method of an electronic device storing user's personal information and biometric information includes, based on a screen including a virtual keyboard, obtaining biometric information through a biometric unit provided in the electronic device, identifying a user corresponding to biometric information on the basis of the stored biometric information, performing screen analysis so as to identify an information type required on the screen, acquiring information corresponding to the information type from the user's personal information, and inputting the acquired information onto the screen.

The user's personal information may include a type of information required by each application and information corresponding to the type of the information, the type of the information comprises at least one of an identification (ID), an e-mail, a password, a card number, a telephone number, or a resident number.

The method may further include, based on a virtual keyboard being included in the screen, identifying an application for providing the screen, and the obtaining the information corresponding to the type of the information may include obtaining information corresponding to the information from the storage based on the identified application.

The user's personal information inlay include a type of information required by each web site and information corresponding to the type of the information, and the type of the information comprises at least one of an identification (ID), an e-mail, a password, a card number, a telephone number, or a resident number.

The method may further include, based on the screen being a screen provided through a web browser and the screen including a virtual keyboard, identifying a web site accessed through the web browser, and the obtaining the information corresponding to the type of the information may include obtaining information corresponding to the type of information based on the identified web site.

The biometric unit may include a camera, and the biometric information obtained through the camera may be at least one of facial information and iris information.

The biometric unit may include a fingerprint recognition sensor, and the biometric information obtained through the fingerprint recognition sensor may be fingerprint information.

The inputting the obtained information to the screen may include, based on obtaining information corresponding to the type of the information, sequentially generating a touch signal on a position of a key item corresponding to the obtained information based on the position information of the key item included in the virtual keyboard and inputting the obtained information on the screen.

The virtual keyboard is a keyboard to which an anti-keylogger is applied, and the inputting the obtained information on the screen may include, based on obtaining information corresponding to the type of the information, obtaining position information of a key item included in the keyboard by analyzing the virtual keyboard, and sequentially generating a touch signal on a position of a key item corresponding to the obtained information and inputting the obtained information on the screen.

The biometric unit may include at least one of a camera and a fingerprint recognition sensor, and the obtaining the biometric information may include, based on a virtual keyboard being included in a screen provided on the display, activating at least one of the camera and the fingerprint recognition sensor to obtain the biometric information.

Effect of Invention

According to various embodiments as described above, since the electronic device inputs personal information of a user, there is an effect of blocking a snooper sneakily seeing an electronic device, when the user inputs personal information.

DESCRIPTION OF DRAWINGS

FIG. 4 is a diagram illustrating personal information according to an embodiment;

FIG. 8 is a flowchart illustrating a method for controlling an electronic device according to an embodiment.

DETAILED DESCRIPTION OF EXEMPLARY ETHBODIMENTS

Figure 1:
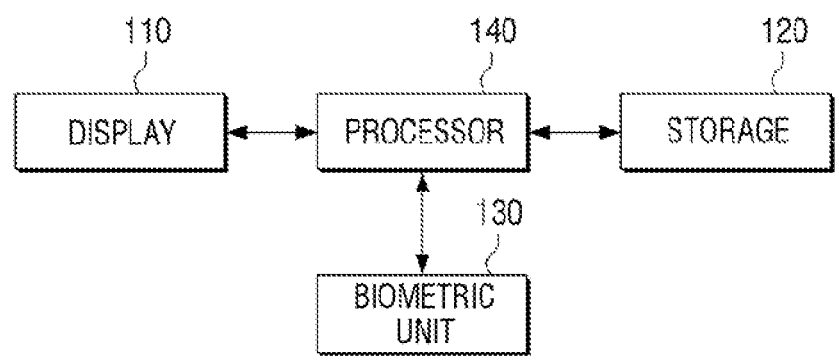
FIG. 1 is a block diagram illustrating a configuration of an electronic apparatus according to an embodiment.

After terms used in the present specification are briefly described, the present disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

Since the disclosure may be variously modified and have several embodiments, specific embodiments of the disclosure will be illustrated in the drawings and be described in detail in the detailed description. However, it is to be understood that the disclosure is not limited to specific exemplary embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms 'first', 'second', and the like, may be used to describe various components, but the components are not to be construed as being limited by the terms. The terms are used only to distinguish one component from another component.

Singular forms are intended to include plural forms unless the context clearly indicates otherwise. It will be further understood that terms "include" or "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

In embodiments of the disclosure, a 'module' or a '~er/~or' may perform at least one function or operation, and be implemented by hardware or software or be implemented by a combination of hardware and software. In addition, a plurality of 'modules' or a plurality of '~ers/~ors' may be integrated in at least one module and be implemented by at least one processor (not illustrated) except for a 'module' or a '~er/or' that needs to be implemented by specific hardware.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted to obviously describe the disclosure, and similar portions will be denoted by similar reference numerals throughout the specification.

FIG. 1 is a block diagram illustrating a configuration of an electronic device according to an embodiment.

Referring to FIG. 1, an electronic device 100 includes a display 110, a biometric unit 130, a storage 120, and a processor 140.

The electronic device 100 according to various embodiments may be implemented as various types of devices such as, for example, and without limitation, at least one of, user terminal devices, display devices, set-top boxes, tablet PCs, smartphones, 3-book reader, desktop PCs, laptop PCs, workstations, servers, a personal digital assistant (PDA), a portable multimedia player (PMP), and an MP3 player. This is merely exemplary, and the electronic device 100 may be implemented as various types of devices such as a navigation device, an automobile infotainment device, various medical devices, Internet of Things, various sensors, or the like.

The display 110 may display various screens. The display 110 may be implemented as various types of displays, such as, for example, and without limitation, a liquid crystal display (LCD), an organic light-emitting diode (OLED), a liquid crystal on silicon (LCoS), a digital light processing (DLP), and the like. The embodiment is not limited thereto, and the display 110 may be implemented as various types capable of displaying a screen.

The storage 120 may store various data such as operating system software module for driving the electronic device 100, applications, contents, user's personal information, biometric information, or the like.

The storage 120 may be implemented as an internal memory such as the ROM, RAM, or the like, included in the processor 140, or a memory separate from the processor 140. In this case, the storage 120 may be implemented as a memory type embedded in the electronic device 100 according to a data storage use, or a memory type detachable from the electronic device 100. For example, the data for driving the electronic device 100 may be stored in a memory embedded in the electronic device 100, and the data for expansion of the electronic device 100 may be stored in a memory detachable from the electronic device 100. The memory embedded in the electronic device 100 may be implemented as a format such as a non-volatile memory, a volatile memory, a hard disk drive (HDD) or a solid state drive (SSD), or the like, and a memory detachable from an acoustic output device 100 may be implemented as a format such as a memory card (for example, a micro secure digital (SD) card, a universal serial bus (USB) memory, or the like), an external memory connectable to the USB port (for example, USB memory), or the like.

The storage 120 may store personal information and biometric information of a user. The personal information of the user may include an identification (ID), an e-mail, a password, a card number, a phone number, an address, a resident number, or the like. The type of information is not limited thereto and may include various types of user identification information requiring security. The biometric information may include at least one of iris information, facial information, and fingerprint information of a user. Various types of biometric information which is different by users, such as, but not limited to, fingerprint, voice, face, iris, lines of the palm, vein distribution, gait, ear shape, genetic information, or the like, may be included.

The personal information of a user according to an embodiment may refer to a type of information required by each of applications and information corresponding to the type of information. For example, the storage 120 may store information corresponding to an ID, a password, and a card number required in the first application, and may store information corresponding to the e-mail, the password, and the resident number required in the second application. Accordingly, the storage 120 may store the type of information required for each application and information corresponding to the type of the information.

The personal information of the user according to another embodiment may refer to the type of information required in each of the web sites and information corresponding to the type of information. In one example, the storage 120 may store information corresponding to the ID, password, and card number required at the first web site (e.g., www.abcd.com), and may store information corresponding to the e-mail, password, and resident number required at the second web site (www.wxyz.com). The storage 120 may store the type of information required for each web site and information corresponding to the type of information. The personal information of the user stored in the storage 120 may include the type of information required for each application and information corresponding to the type, the type of information required for each web site and information corresponding to the type of information. This will be described in detail with reference to FIG. 4. According to an embodiment, personal information and biometric information of a user may be received from an external server and stored in the storage 120.

The biometric recognition unit 130 may recognize the biometric information of the user of the electronic device 100 and transmit the data that is obtained by converting the recognized biometric information into an electric signal to the processor 140. For example, the biometric unit 130 may include a camera (not shown) and obtain biometric information through the camera. Here, the biometric information may refer to at least one of facial information and iris information.

However, the biometric recognition unit 130 is not limited thereto and may include various types of sensors and may obtain biometric information using a sensor. The sensor may include at least one of an e-nose sensor, an electromyography (EMG) sensor, an electroencephalogram (EEG) sensor, an electrocardiogram (ECG) sensor, an infrared (IR) sensor, an iris sensor, or a fingerprint recognition sensor. For example, the biometric unit 130 may include a fingerprint recognition sensor and may obtain fingerprint information of the user through the fingerprint recognition sensor. The biometric unit 130 may not only obtain one type of biometric information, but also include a camera and a fingerprint recognition sensor at the same time, and may obtain various types of biometric information.

The processor 140 controls overall operation of the electronic device 100.

According to an embodiment, the processor 140 may include one or more among a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor 140 may be implemented in a system on chip (SoC) type or a large scale integration (LSI) type which a processing algorithm is built therein or in a field programmable gate array (FPGA) type.

According to an embodiment, the processor 140 may identify whether a virtual keyboard is included in a screen provided on the display. According to one embodiment, if a portion where the text input is required is touched, the processor 140 may display a virtual keyboard for text input. If a user interface (UI) that includes a predetermined number or more buttons (e.g., numbers or character key items), the processor 140 may identify that a virtual keyboard is included in the screen. As another example, when a separate application for providing a virtual keyboard is executed, it may be identified that a virtual keyboard is included in the screen. As another example, if the processor 140 analyzes the screen and identifies that a screen, contents provided by the application, or the like, are provided in an upper portion of the displayed screen, and a including a plurality of key items are displayed on a lower portion of the screen, the processor 140 may identify that the virtual keyboard is included in the screen. The embodiment is not limited thereto, and it may be identified whether the virtual keyboard is included based on various methods of identifying an object included in the screen.

The virtual keyboard is a kind of program provided by an application or an operating system to input text (numbers, characters, or special characters), shortcut keys, and special command functions, or the like, and may control the electronic device 100 similar to a physical keyboard. The virtual keyboard may have a variety of keyboard formats such as a qwerty, a two set keyboard, a three set keyboard, a numeric keypad, a Chun-Ji-In keyboard, or the like as a touch UI for receiving characters such as a text from a user.

The virtual keyboard may be referred to variously as an image keyboard, a soft keyboard, or the like, but will hereinafter be referred to as a virtual keyboard for convenience.

If the virtual keyboard is included in the screen, the processor 140 may obtain the biometric information of the user through the biometric unit 130 and identify the user corresponding to the biometric information obtained based on the biometric information stored in the storage 120. For example, the biometric unit 130 may include a fingerprint recognition sensor and may obtain the user's fingerprint information via a fingerprint recognition sensor. The processor 140 may compare the acquired fingerprint information with the fingerprint information of the biometric information stored in the storage 120 to identify a user corresponding to the acquired fingerprint information.

According to an embodiment, if a virtual keyboard is included in a screen provided on a display, the processor 140 may activate the biometric unit 130 to obtain biometric information of the user. As an example, the biometric unit 130 may include at least one of a camera and a fingerprint recognition sensor, and the processor 140 may activate at least one of the camera and the fingerprint recognition sensor to obtain at least one of iris information, facial information, and fingerprint information. As another example, the biometric unit 130 may be activated regardless of whether the virtual keyboard is included in the screen, and the biometric unit 130 may obtain the biometric information of the user.

The processor 140 according to an embodiment may display a guide UI for obtaining biometric information of the user if the virtual keyboard is included on the screen. As an example, in order to obtain at least one of iris information and facial information among biometric information of a user, the processor 140 may display a guide UI such as "Please look at the camera". As another example, the processor 140 may display a guide UI, such as "Please touch a fingerprint recognition sensor," to obtain fingerprint information among biometric information.

The processor 140 may analyze the displayed screen to identify the required type of information on the screen. As an example, it may be assumed that the type of information required on the screen is a "password", and "password" is inputted using a virtual keyboard included in the screen. The processor 140 may analyze the screen to identify a "password" as the type of information that the input is required.

The processor 140 may obtain information corresponding to the type of information identified in the identified user's personal information. For example, if "password" is identified as the type of information required, the processor 140 may obtain information (e.g., abcd123) corresponding to the "password" in the user's personal information. The processor 140 may input the obtained information on a screen. Accordingly, if the user does not directly input the password using the virtual keyboard, but the biometric information and the biometric information recognized by the biometric unit 130 are matched, the processor 140 may obtain a password from the user's personal information and input the password on the screen.

The processor 140 according to an embodiment may identify an application that is being executed. The processor 140 may obtain, from the user's personal information, the information corresponding to the required type of information based on the identified application.

As an example, a situation where the type of information required on the screen on which the first application is displayed is "ID" may be assumed. The processor 140 may obtain the ID for the first application in the personal information of the user corresponding to the biometric information. By inputting the obtained "ID" by the processor 140 on the screen, a user may feel less troublesome to directly input the "ID" by using a virtual keyboard included on the screen.

As another example, a situation where a virtual keyboard is included in a screen and a web site is accessed through a web browser may be assumed. The processor 140 may identify a web site accessed via a web browser and analyze the screen to identify the type of information required. For example, if the first web site is accessed through the web browser and information required at the first web site is "card number", the processor 140 may obtain a "card number" for the first website in the personal information of the user corresponding to the biometric information. When the processor 140 inputs the obtained "card number" on the screen, the user may not have to directly input the "card number" using a virtual keyboard or a physical keyboard.

The processor 140 according to an embodiment may sequentially generate a touch signal at a position of a key item corresponding to the obtained information to input the obtained information on the screen. For example, the processor 140 may know the position information corresponding to each of the key items included in the virtual keyboard. For example, the processor 140 may know the coordinate information as position information corresponding to each of the key items, such as "a" as (1,3) and "z" as (2,2). The processor 140 may sequentially generate a touch signal at a position (or a coordinate) of the key item corresponding to the obtained information to input the obtained information on the screen.

The virtual keyboard according to an embodiment may have a basic layout. For example, the virtual keyboard may have a layout corresponding to the qwerty keyboard, and the processor 140 may be pre-store position information of each of the key items included in the virtual keyboard according to the qwerty layout. The processor 140 may generate a touch signal at a position of the key item corresponding to the information obtained based on the pre-stored position information.

The virtual keyboard according to another embodiment may have a different layout per application, per web site, or randomly (e.g., over time) instead of a basic layout. In one example, an arrangement state or a layout of the key items of a virtual keyboard included on a screen displayed upon executing the A Bank application are not fixed and may be flexible. Thus, the arrangement state or layout of the key items of the virtual keyboard may be randomly changed for every execution time of the application. For example, the virtual keyboard may be a keyboard to which an anti-keylogger is applied. Here, keylogger or keylogging (keystroke logging) refers to a hacking action in which the contents inputted by a user to a PC using a keyboard are intercepted and recorded. Since the arrangement state, layout, or the like, of the key items included in the virtual keyboard to which the anti-key logging is applied to prevent key logging are randomly changed, the processor 140 may analyze the virtual keyboard to obtain the position information of the key items. The processor 140 may sequentially generate a touch signal at a position of the key item corresponding to the obtained information based on the position information of the key items to input the obtained information on the screen. A detailed description will be made with reference to FIGS. 5 and 6.

The processor 140 according to an embodiment may display a UI for modifying personal information and biometric information of a user when a user corresponding to the acquired biometric information is identified. As an example, the electronic device 100 may provide a UI for inputting the changed "ID" and "password" or the like, to update "ID" and "password" among the user's personal information, and may provide the UI in case only when the user is identified according to the obtained biometric information.

Figure 2:
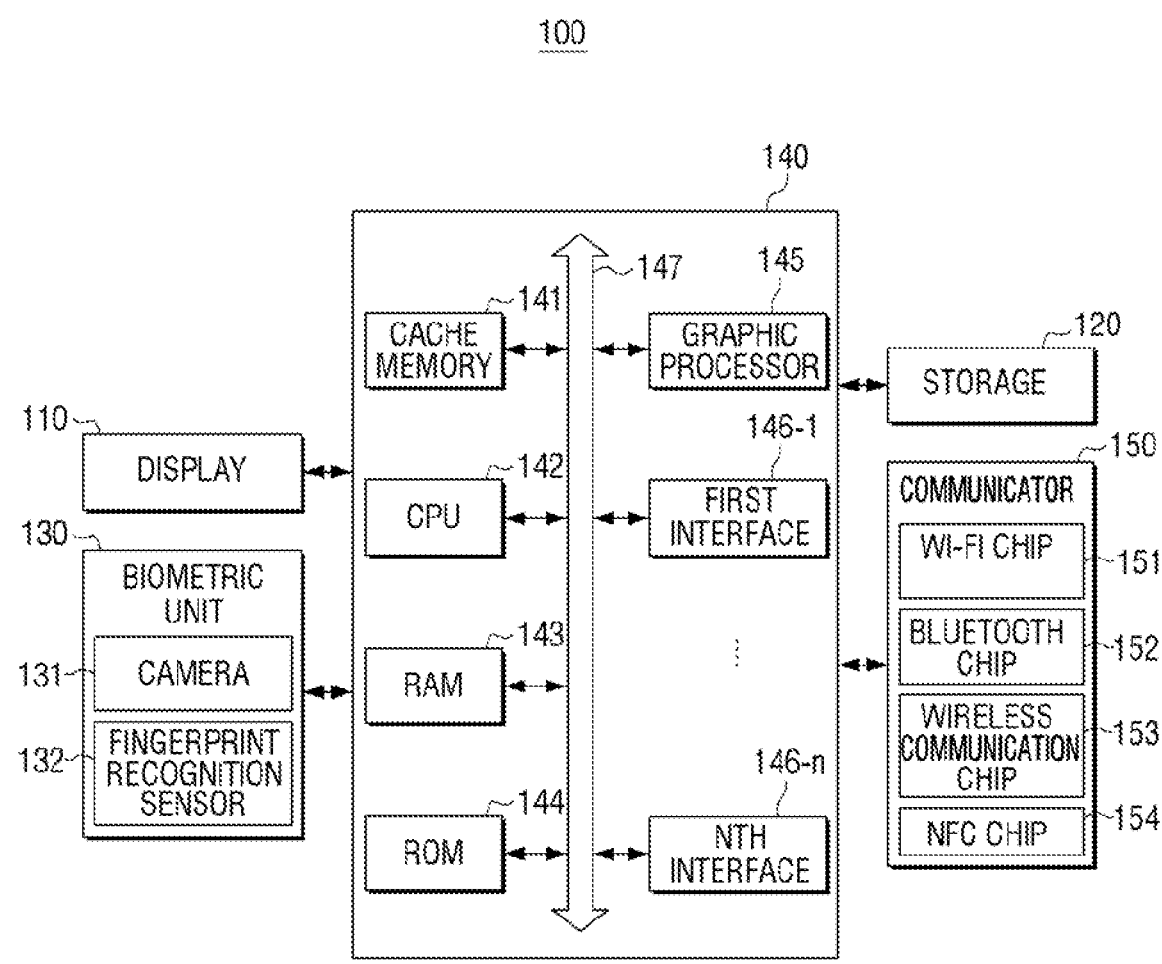
FIG. 2 is a block diagram illustrating a detailed configuration of an electronic apparatus according to an embodiment.

FIG. 2 is a block diagram illustrating a detailed configuration of an electronic apparatus according to an embodiment.

Referring to FIG. 2, the electronic device 100 includes the display 110, the storage 120, the biometric unit 130, a processor 140, and a communicator 150. For the configurations shown in FIG. 2, a detailed description will be omitted.

Referring to FIG. 2, a remote control device 100 includes a display 110, a storage 120, the biometric unit 130, a processor 140, and a communicator 150. For the configurations shown in FIG. 2, a detailed description will be omitted.

The processor 140 controls overall operations of the electronic device 100 using various programs stored in the storage 120.

The processor 140 includes a cache memory 141, a main central processing unit (CPU), random access memory (RAM) 143, read-only memory (ROM) 144, a graphic processor 145, first to $n^{th}$ interfaces 146-1~146-n, and bus 147.

Here, the cache memory 141, the main CPU 142, the RAM 143, the ROM 144, the graphic processor 145, the first to $n^{th}$ interfaces 146-1~146-n, or the like, may be interconnected through the bus 147.

The first to $n^{th}$ interface 146-1 to 146-n are connected to the various elements as described above. One of the interfaces may be network interface which is connected to an external device through network.

The main CPU 142 accesses the storage 120 and performs booting using the O/S stored in the storage 120. The main CPU 142 performs various operations using various programs and content data, or the like, stored in the storage 120.

The ROM 144 stores a command set for booting the system and the like. When the turn-on command is input and power is supplied, the main CPU 142 copies the O/S stored in the storage 120 to the RAM 143 according to the instruction stored in the ROM 144, executes O/S to boot the system. When the booting is completed, the main CPU 142 may copy various programs stored in the storage 120 to the RAM 143, execute programs copied to the RAM 143, and perform various operations.

The graphic processor 145 generates a screen including various objects such as an icon, an image, a text, or the like, using an operator (not shown) and a renderer (not shown). The operator (not shown) may operate an attribute value such as a coordinate value, a shape, a size, a color, or the like, at which each object is displayed according to a layout of a screen. The renderer generates screens of various layouts including the objects based on the attribute values calculated by the operator. The screen generated in the renderer is displayed within the display area of the display 110.

The operation of the processor 140 described above may be performed by a program stored in the storage 120.

The communicator 150 is configured to communicate with various types of external devices according to various types of communication methods. The communicator 150 includes a Wi-Fi chip 151, a Bluetooth chip 152, a wireless communication chip 153, and an NFC chip 154, and the like. The processor 140 performs communication with various external devices using the communicator 150.

The Wi-Fi chip 151 and the Bluetooth chip 152 communicate using the WiFi method and the Bluetooth method, respectively. When the Wi-Fi chip 151 or the Bluetooth chip 152 is used, various connection information such as a service set identifier (SSID) and a session key may be transmitted and received first, and communication information may be used to transmit and receive various information. The wireless communication chip 153 refers to a chip that performs communication according to various communication standards such as IEEE, Zigbee, 3rd Generation (3G), Third Generation Partnership Project (3GPP), Long Term Evolution (LTE), and Near-Field Communication (NFC). NFC means uses, for example, a 13.56 MHz band among various RF-ID frequency bands such as 135 kHz, 13.56 MHz, 433 MHz, 860 to 960 MHz, 2.45 GHz, or the like.

The user interface (not shown) receives various user interactions. Here, the user interface may be implemented in various forms according to an embodiment of the electronic device 100. For example, the user interface may be a button provided on the electronic device 100, a microphone for receiving a user's voice, a camera for detecting user's motion, or the like. Alternatively, when the electronic device 100 is implemented as a touch-based electronic device, the user interface may be implemented as a touch screen having a mutual layer structure with the touch pad. In this case, the user interface may be used as the display 110 described above.

Hereinbelow, operations of the electronic device 100 will be further described with reference to various drawings.

Figure 3:
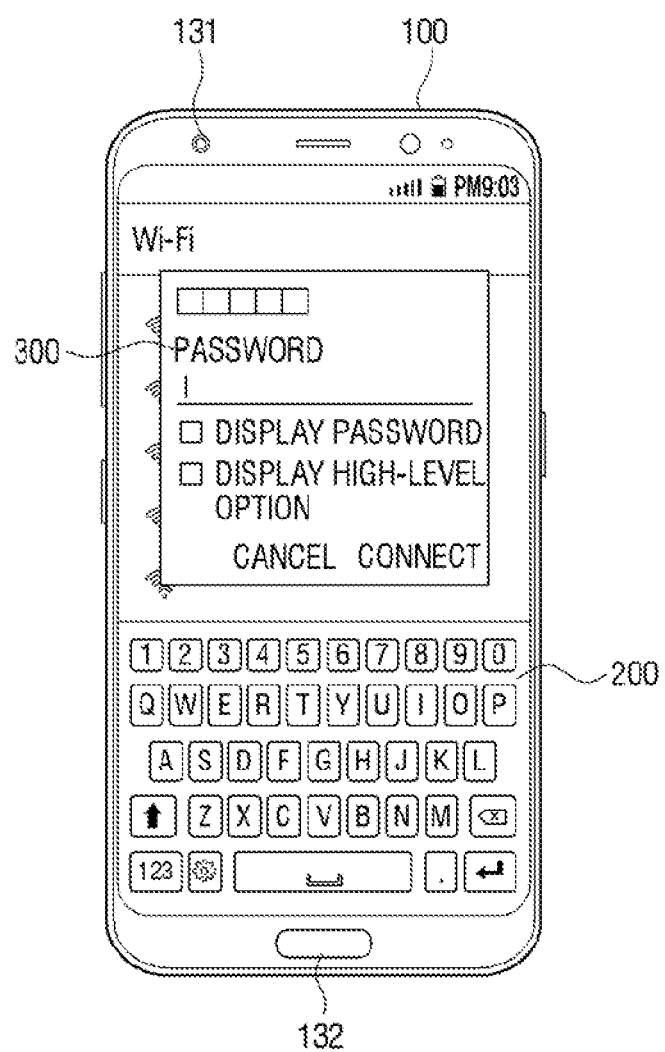
FIG. 3 is a diagram illustrating a virtual keyboard according to an embodiment.

FIG. 3 is a diagram illustrating a virtual keyboard according to an embodiment.

As shown in FIG. 3, if a virtual keyboard 200 is included on a screen, the electronic device 100 may obtain biometric information of the user of the electronic device 100. For example, the electronic device 100 may include at least one of a camera 131 and a fingerprint recognition sensor 131, and when biometric information of the user is obtained using at least one of the camera 131 and the fingerprint recognition sensor 131, the electronic device 100 may identify a user corresponding to the acquired biometric information.

According to an embodiment, the electronic device 100 may store biometric information of a user. For example, by analyzing the image obtained through the camera 131 included in the electronic device 100, the user's facial information, iris information, or the like, may be stored as biometric information. If the virtual keyboard 200 is included on the displayed screen, the electronic device 100 may obtain the biometric information of the user and compare the obtained biometric information with the pre-stored biometric information to identify the user. The biometric information may include at least one of facial information, iris information, or fingerprint information. Various types of biometric information such as, but not limited to, a fingerprint, a voice, a face, an iris, a lines on the palm, a vein distribution, a gait, an ear shape, and genetic information may be obtained through various types of the biometric unit 130, and a user corresponding to the biometric information obtained based on the biometric information may be identified.

The electronic device 100 may analyze the screen to identify a type 300 of information required on the screen. As shown in FIG. 3, it is assumed that a password input is requested on a screen, and the virtual keyboard 200 is displayed so that a user may input a password. The electronic device 100 may analyze the screen to identity "password" as the type 300 of information required.

According to an embodiment, the electronic device 100 may obtain information corresponding to the type 300 of information required in the personal information of the user identified according to the biometric information. As shown in FIG. 3, if "password" is identified as the required information type 300, a "password" may be obtained from the user's personal information.

According to an embodiment, if a user identified according to biometric information is a first user, a password may be obtained from personal information of the first user, and if the user is the second user, a password may be obtained from the personal information of the second user. The electronic device 100 may store personal information for each user.

An embodiment of user's personal information will be described below.

FIG. 4 is a diagram illustrating personal information according to an embodiment.

Referring to FIG. 4, the user's personal information 400 may include a plurality of categories. For example, the user's personal information 400 may include an application 410, an ID 421, a password 422, a card number 423, a telephone number 424, or the like. Here, the ID 421, the password 422, the card number 423, the phone number 424, or the like, may refer to the type 420 of information required in the application. For example, in executing the A Bank application, a situation where input of the ID 421 and the password 422 is required may be assumed. When the virtual keyboard 200 is displayed, the electronic device 100 may identify the user according to the biometric information and obtain "abc" and "1234abc" corresponding to the ID 421 and the password 422 of the A Bank in the personal information 400 of the identified user.

The user's personal information 400 according to an embodiment may include various types of categories. As shown in FIG. 4, the information type 420 is not limited to the ID 421, the password 422, the card number 423, and the phone number 424, and any information which is capable of identifying an individual, such as an address, an authentication number, a resident number, etc., and which is unique to each person may be included in one category of the personal information 400 of the user.

As another example, if the electronic device 100 is executing an e-shopping application, and the virtual keyboard 200 is displayed, the electronic device 100 may analyze the screen to identify the required type of information 420. If the type of information 420 required is a card number 423, the electronic device 100 may obtain "1234-xxxx-xxxx-4321" corresponding to the card number 423 of the e-shopping application. The electronic device 100 may enter the acquired card number 423 on the screen. Thus, the user may not directly enter a card number.

As another example, the user's personal information 400 may refer to information corresponding to the type of information 420 and the type of information required at each of the web sites. The electronic device 100 may, in addition to the application, store information corresponding to the type of information 420 and the type of information 420 required at the web site and the web site as the user's personal information 400.

For example, information corresponding to the ID 421, the password 422, and the card number 423 required at the first web site (e.g., www.abcd.com) may be stored, and the ID 421 and the password 422 required in the second web site (www.wxyz.com) may be stored.

If the virtual keyboard 200 is included in the screen provided through the web browser, the electronic device 100 may identify a web site connected through the web browser and obtain information corresponding to the type 200 of information required in the personal information 400 of the user according to the biometric information based on the identified web site.

Hereinbelow, the virtual keyboard 200 according to various embodiments will be described.

Figure 5:
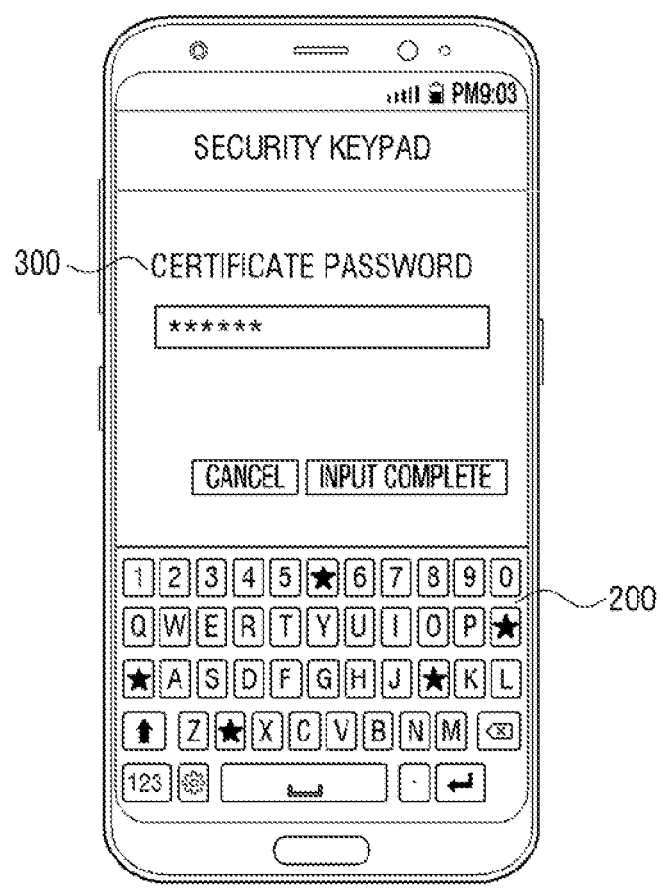
FIG. 5 is a diagram illustrating a method for inputting information on a screen according to an embodiment.

FIG. 5 is a diagram illustrating a method for inputting information on a screen according to an embodiment.

As shown in FIG. 5, the electronic device 100 may input the obtained information on a screen. For example, if a type 300 of information required in the application is a "certificate password", the electronic device 100 may obtain a "certificate password" in the user's personal information. The electronic device 100 may enter the "certificate password" on the screen.

The virtual keyboard 200 may be a keyboard to which an anti-keylogger method is applied. According to one of the anti-keylogger method, the arrangement state (or layout) of key items such as numbers, characters, special characters, and specific function keys (Alt, Ctrl and Shift, etc.) included in the virtual keyboard 200 may be flexibly changed. For example, as shown in FIG. 5, "★" key item may be placed between key items. Here, the "★" key item may be a key item in which no number or character is input even if a touch is input. Since the layout of the virtual keyboard 200 is not constant, the electronic device 100 may analyze the virtual keyboard 200 to obtain position information of a key item included in the virtual keyboard 200, and sequentially generate a touch signal at a position of the key item corresponding to the obtained information to input the obtained information on the screen. For example, if the information obtained as shown in FIG. 4 is "abc" corresponding to the ID of the B Bank application, the electronic device 100 may obtain the position information of the key item included in the virtual keyboard 200 and sequentially generate a touch signal at a position corresponding to each of "a," "b," and "c," based on the position information to obtain the abc. The electronic device 100 is not limited thereto and may input obtained information without generating a touch signal. The "★" key item shown in FIG. 5 is only one example, but is not limited thereto. Various embodiments may be applied to input the obtained information input if the layout relationship or layout of the key item is not fixed and flexible, as the anti-key logging scheme is applied.

Since the layout of the virtual keyboard 200 to which the anti-keylogger method is applied is flexible, the electronic device 100 may analyze the virtual keyboard 200 every predetermined time interval or whenever the virtual keyboard 200 is displayed to obtain the position information of the key item included in the virtual keyboard 200.

Figure 6:
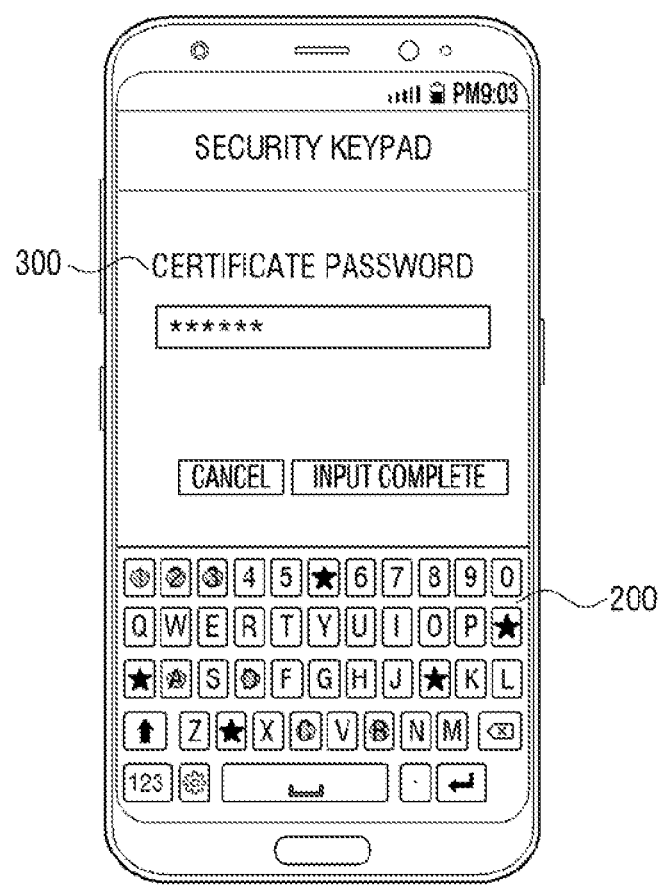
FIG. 6 is a diagram illustrating a method for inputting information on a screen according to another embodiment.

FIG. 6 is a diagram illustrating a method for inputting information on a screen according to another embodiment.

According to another embodiment, the electronic device 100 may display a predetermined touch effect while sequentially generating a touch signal. As an example, the obtained information may be "abcd123" and a visual touch effect may be displayed together while sequentially generating a touch signal at a position corresponding to the key items "a," "b," "c." "d," "1," "2," and "3" corresponding to the obtained information.

According to another embodiment, the virtual keyboard 200 included on the screen of the electronic device 100 may be the virtual keyboard 200 that follows a pre-stored basic layout. For example, the qwerty-type virtual keyboard 200 may be displayed. The electronic device 100 may pre-store the position information of the key item included in the virtual keyboard 200 following the basic layout, and may generate a touch signal at the position of the key item corresponding to the obtained information based on the information obtained by the virtual keyboard 200 without analyzing the virtual keyboard 200, to input the obtained information.

Figure 7:
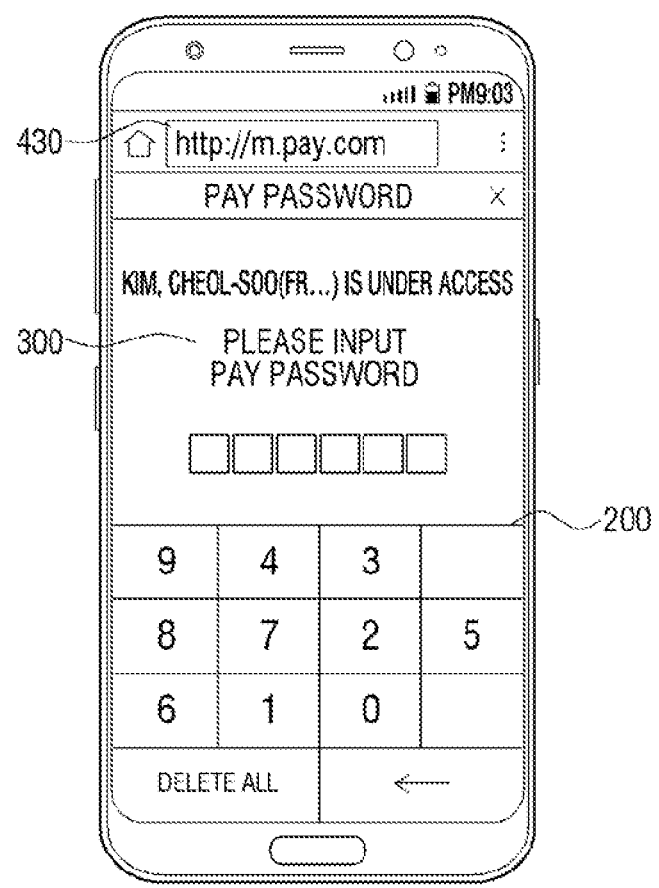
FIG. 7 is a diagram illustrating an example of including a virtual keyboard on a web browser screen according to an embodiment.

FIG. 7 is a diagram illustrating an example of including a virtual keyboard on a web browser screen according to an embodiment.

As illustrated in FIG. 7, the electronic device 100 may access a web site through a web browser and may display the virtual keyboard 200 to input the information 300 required by the web site.

The electronic device 100 can identify the connected web site through a web browser when the virtual keyboard 200 is displayed. The electronic device 100 may identify the type 300 of information required on the screen of the identified web site 430. As an example, if "password" is required, the electronic device 100 may obtain information corresponding to "password" from the user's personal information identified according to biometric information.

According to an embodiment, the electronic device 100 may identify an application or web site if the virtual keyboard 200 is included on the screen, and obtain information corresponding to the type 300 of information required based on the identified application or web site.

According to an embodiment, the electronic device 100 may compare biometric information of a user obtained through the biometric unit 130 with pre-stored biometric recognition information, and if the user is identified according to the comparison result, obtain information corresponding to the type 200 of information required in personal information of the identified user.

The electronic device 100 according to another embodiment can obtain biometric information of the user through the biometric unit 130 if the virtual keyboard 200 is included on the screen, and compare the biometric information and the pre-stored biometric information to identify the user. The electronic device 100 may analyze the screen and identify the type of information required on the screen, as long as the user is identified.

FIG. 8 is a flowchart illustrating a method for controlling an electronic device according to an embodiment.

The electronic device storing personal information and biometric information of a user according to an embodiment obtains biometric information through a biometric unit provided in the electronic device if a virtual keyboard is included in a screen in operation S810.

A user corresponding to the biometric information is identified based on the stored biometric information in operation S820.

By analyzing a screen, a type of information requested on a screen is identified in operation S830.

Information corresponding to a type of information, among the user's personal information, may be obtained in operation S840.

The obtained information is input on a screen in operation S850.

The user's personal information may include information corresponding to the type of information and the type of information required in each application, and the type of information may include at least one of an ID, an e-mail, a password, a card number, a telephone number, or a resident number.

According to an embodiment, the control method may further include identifying an application for providing a screen if the virtual keyboard is included in the screen, and obtaining information corresponding to the type of information in S840 may obtain information corresponding to the type of information based on the identified application.

As another example, the user's personal information may include information corresponding to the type of information and type of information required in each of the web sites, and the type of information may include at least one of an ID, an e-mail, a password, a card number, a telephone number, or a resident number.

According to an embodiment, a control method may further include a step of, based on a screen being a screen provided through a web browser and the screen including a virtual keyboard, identifying an accessed web site a web browser, and the step of obtaining information corresponding to the type of information in S840 may include obtaining information corresponding to the type of information based on the identified web site.

The biometric unit may include a camera and the biometric information obtained through the camera may be at least one of facial information and iris information.

As another example, the biometric unit may include a fingerprint recognition sensor, and the biometric information obtained through the fingerprint recognition sensor may be fingerprint information.

In step S850 of inputting the obtained information on the screen may include, based on information corresponding to the type of information being obtained, sequentially generating a touch signal at the position of the key item corresponding to the obtained information on the basis of the position information of the key item included in the virtual keyboard to input the obtained information on the screen.

As another example, the virtual keyboard is a keyboard to which an anti-keylogger method is applied, and the step of inputting the obtained information on a screen may include the steps of obtaining position information of a key item included in a virtual keyboard by analyzing a virtual keyboard when information corresponding to the type of information is obtained and inputting the obtained information on a screen by sequentially generating a touch signal at a position of a key item corresponding to the obtained information.

According to an embodiment, the biometric unit may include at least one of a camera and a fingerprint recognition sensor, and the step of acquiring biometric information in S810 may include activating at least one of a camera and a fingerprint recognition sensor to obtain biometric information if the virtual keyboard is included in the screen.

The various embodiments described above may be embodied in a recording medium which may be read by a computer or a similar device by using software, hardware or combination thereof. In some cases, the embodiments described herein may be implemented by the processor itself. According to a software implementation, embodiments such as the procedures and functions described herein may be implemented in separate software modules. Each of the software modules may perform one or more of the functions and operations described herein.

Computer instructions for performing a processing operation according to the above-described various embodiments may be stored in a non-transitory computer-readable medium. The computer instructions stored in the non-transitory computer-readable medium may allow a specific device to perform the processing operation according to the above-described embodiments when the computer instructions are executed through a processor.

The non-transitory computer-recordable medium is not a medium configured to temporarily store data such as a register, a cache, or a memory but an apparatus-readable medium configured to semi-permanently store data. Specifically, the non-transitory apparatus-readable medium may be a compact disc (CD), a digital versatile disc (DVD), a hard disc, a Blu-ray disc, a universal serial bus (USB), a memory card, a read only memory (ROM), and the like.

The present teaching can be readily applied to other types of apparatuses. Also, the description of embodiments is intended to be illustrative, and not to limit the scope of the claims, and many alternatives, modifications, and variations will be apparent to those skilled in the art. While one or more embodiments have been described with reference to the figures, it will be understood by those of ordinary skill in the art that various changes in form and details may be made therein without departing from the spirit and scope as defined by the following claims and their equivalents.

What is claimed is:

1. An electronic device comprising:
   a display;
   a storage for storing personal information of a user and first biometric information;
   a biometric unit; and
   a processor configured to:
      based on a screen provided on the display including a virtual keyboard, identify the user corresponding to second biometric information acquired through the biometric unit based on the first biometric information, perform a screen analysis so as to identify an information type required on the screen, acquire information corresponding to the information type from the personal information,
      based on acquiring the information corresponding to the information type, sequentially generate a touch signal on a key item of the virtual keyboard corresponding to the acquired information based on position information of the key item of the virtual keyboard and input the acquired information on the screen, and
      input the acquired information onto the screen.

2. The electronic device of claim 1, wherein:
   the personal information comprises a type of information required by each application and information corresponding to the type of the information,
   the type of the information comprises at least one from among an identification (ID), an e-mail, a password, a card number, a telephone number and a resident number.

3. The electronic device of claim 2, wherein the processor is further configured to:
   based on the virtual keyboard being included in the screen, identify an application provided on the screen, identify the type of information required on the screen by analyzing the screen, and obtain information corresponding to the information from the storage based on the identified application.

4. The electronic device of claim 1, wherein:
   the personal information comprises a type of information required by each web site and information corresponding to the type of the information, and
   the type of the information comprises at least one from among an identification (ID), an e-mail, a password, a card number, a telephone number and a resident number.

5. The electronic device of claim 4, wherein the processor is configured to:
   based on the screen being provided through a web browser and the screen including the virtual keyboard, identify a web site accessed through the web browser, identify the type of information required on the screen by analyzing the screen, and obtain information corresponding to the information from the storage based on the identified web site.

6. The electronic device of claim 1, wherein:
   the biometric unit comprises a camera, and
   the second biometric information obtained through the camera is at least one of facial information and iris information.

7. The electronic device of claim 1, wherein:
   the biometric unit comprises a fingerprint recognition sensor, and
   the second biometric information obtained through the fingerprint recognition sensor is fingerprint information.

8. The electronic device of claim 1, wherein:
   the virtual keyboard is a keyboard to which an anti-keylogger is applied,
   the processor is configured to:
   based on obtaining the information corresponding to the type of the information, obtain the position information of the key item included in the virtual keyboard by analyzing the virtual keyboard, and sequentially generate the touch signal on one or more key items corresponding to the obtained information and input the obtained information on the screen.

9. The electronic device of claim 1, wherein:
   the biometric unit comprises at least one of a camera and a fingerprint recognition sensor, and
   the processor is configured to, based on the virtual keyboard being included in the screen provided on the display, activate at least one from among the camera and the fingerprint recognition sensor.

10. A control method of an electronic device storing personal information of a user and first biometric information, the method comprising:
    based on a screen including a virtual keyboard, obtaining second biometric information through a biometric unit provided in the electronic device;
    identifying the user corresponding to the second biometric information based on the first biometric information;
    performing screen analysis so as to identify an information type required on the screen;
    acquiring information corresponding to the information type from the personal information;

based on acquiring the information corresponding to the information type, sequentially generating a touch signal on a key item of the virtual keyboard corresponding to the acquired information based on position information of the key item of the virtual keyboard; and inputting the acquired information onto the screen.

11. The method of claim 10, wherein:

the personal information comprises a type of information required by each application and information corresponding to the type of the information, the type of the information comprises at least one from among an identification (ID), an e-mail, a password, a card number, a telephone number and a resident number.

12. The method of claim 11, further comprising:

based on the virtual keyboard being included in the screen, identifying an application provided on the screen, wherein the obtaining the information corresponding to the type of the information comprises obtaining information corresponding to the information from a storage of the electronic device based on the identified application.

13. The method of claim 10, wherein:

the personal information comprises a type of information required by each web site and information corresponding to the type of the information, and the type of the information comprises at least one from among an identification (ID), an e-mail, a password, a card number, a telephone number and a resident number.

14. The method of claim 13, further comprising:

based on the screen being provided through a web browser and the screen including the virtual keyboard, identifying a web site accessed through the web browser, wherein the obtaining the information corresponding to the type of the information comprises obtaining information corresponding to the type of information based on the identified web site.

* * * * *